(12) United States Patent
Mekid et al.

(10) Patent No.: US 8,893,557 B2
(45) Date of Patent: Nov. 25, 2014

(54) FASTENER TENSION MONITORING SYSTEM

(71) Applicants: King Fahd University of Petroleum and Minerals, Dhahran (SA); King Abdulaziz City for Science and Technology, Riyadh (SA)

(72) Inventors: Samir Mekid, Dhahran (SA); Uthman Baroudi, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 61 days.

(21) Appl. No.: 13/737,908

(22) Filed: Jan. 9, 2013

(65) Prior Publication Data

US 2014/0190267 A1    Jul. 10, 2014

(51) Int. Cl.
*F16B 31/02*     (2006.01)
*G01N 3/08*      (2006.01)

(52) U.S. Cl.
CPC ........................................ *G01N 3/08* (2013.01)
USPC ............................................... 73/761; 73/777

(58) Field of Classification Search
USPC ............................. 73/760, 761, 777
See application file for complete search history.

(56) References Cited

U.S. PATENT DOCUMENTS

| | | | |
|---|---|---|---|
| 4,566,316 A * | 1/1986 | Takeuchi | 73/754 |
| 7,293,466 B2 | 11/2007 | Ohta et al. | |
| 7,467,556 B2 * | 12/2008 | Kibblewhite et al. | 73/761 |
| 7,698,949 B2 * | 4/2010 | Akdeniz et al. | 73/649 |
| 7,819,017 B2 * | 10/2010 | Munz et al. | 73/761 |
| 7,946,179 B2 * | 5/2011 | Kibblewhite et al. | 73/761 |
| 8,024,980 B2 | 9/2011 | Arms et al. | |
| 8,608,398 B2 * | 12/2013 | Mekid | 403/90 |
| 2008/0236285 A1 | 10/2008 | McInerney et al. | |
| 2009/0151466 A1 * | 6/2009 | Wu et al. | 73/761 |
| 2010/0141094 A1 | 6/2010 | Lee et al. | |
| 2010/0308794 A1 | 12/2010 | Townsend et al. | |
| 2011/0181393 A1 | 7/2011 | Tillotson et al. | |

FOREIGN PATENT DOCUMENTS

JP    11-118637    4/1999

OTHER PUBLICATIONS

Website, http://www.ge-mcs.com/download/ultrasound/bolt-extensometer/stresstel-boltmike3-theory.p, article titled "Bolt Stress Measurement Using Ultrasonics," three pages printed from the internet on Apr. 25, 2012.

(Continued)

*Primary Examiner* — Max Noori
(74) *Attorney, Agent, or Firm* — Richard C. Litman

(57) ABSTRACT

The fastener tension monitoring system provides for automatic notification when a structural tensile fastener, such as a bolt, is loosened. The system incorporates piezoelectric material in the core of the fastener shank or deposited around the shank. The piezoelectric material communicates electrically with an electrical storage device, a microprocessor, and a transmitter installed on the fastener head. Vibration or other changes in the tensile force developed by the fastener result in electrical impulses being generated by the piezoelectric material, generating electrical energy that is stored in the storage device and used to operate the microprocessor. In the event that an out of tolerance condition is sensed by the microprocessor, the transmitter is activated to send a signal to that effect. A receiver and computer are provided to monitor any such signals. The piezoelectric material may include pyroelectric material as well for the generation of electrical energy due to temperature changes.

5 Claims, 2 Drawing Sheets

(56) References Cited

OTHER PUBLICATIONS

Website, http://www.analog.com/en/rfif-components/direct-digital-synthesis-dds/ad5933, data sheet for the AD5933 impedance converter network analyzer, two sheets printed from the internet on Apr. 25, 2012.

* cited by examiner

FASTENER TENSION MONITORING SYSTEM

BACKGROUND OF THE INVENTION

1. Field of the Invention

The present invention relates generally to automated monitoring devices, and particularly to a fastener tension monitoring system, particularly for monitoring threaded bolts, that generates electrical energy from forces imparted to the fastener and uses the energy to transmit data regarding those forces.

2. Description of the Related Art

Large structures (such as buildings, bridges, factories and manufacturing plants, ships, aircraft, etc.) are conventionally assembled using tensile fasteners, such as bolts, among other assembly means. A great deal of knowledge has been accrued over the years regarding the sizes and types of fasteners required for any given structure, and the gripping force that must be provided by the fasteners to provide a safe and sound structure.

While the structures and fasteners may be assembled properly during the construction process, various conditions act upon structural joints over time to cause the fasteners to loosen. Vibration due to traffic (on bridges) and the operation of associated machinery can act to loosen bolts and rivets in the structure. Corrosion can reduce the strength of a fastener and/or the adjacent structural material in a structure. The fastener itself may stretch slightly over time, resulting in a loosened joint.

As a result periodic inspections are required of many, if not most, large structures to detect any substandard joints or connections, and to repair those joints or connections as required. Such inspections are, of course, costly in terms of man-hours, and often require the operation of the structure to be shut down during the course of the inspection. This is particularly true of ships and aircraft, but may also hold true for various factories, manufacturing plants, pipelines, and similar structures, depending upon the depth of the inspection required. In most cases such inspections will not turn up any problems, with problems that are detected normally being a small minority of the total structural assembly. Nevertheless, the time required to perform the inspection, and the time lost from being unable to use the structure, remain the same whether problems are found or not.

Thus, a fastener tension monitoring system solving the aforementioned problems is desired.

SUMMARY OF THE INVENTION

The fastener tension monitoring system includes a bolt having a piezoelectric element incorporated therewith. The piezoelectric element may include pyroelectric properties as well, i.e., the generation of electrical energy as the material changes temperature state. The piezoelectric or pyroelectric material may be incorporated in a hollowed portion of the shank of the bolt, or the shank may be coated with the material. Electrical leads are extended from the piezoelectric/pyroelectric element through the head of the bolt, where they are connected to an electrical energy storage device, such as a small electrical storage cell (battery) or a capacitor atop the head of the bolt. Changes in the gripping force developed by the bolt due to vibration or other forces induced in the structure result in the generation of a small amount of electrical energy that is stored in the electrical energy storage device (battery or capacitor). If a pyroelectric element is used, temperature changes induced in the bolt due to environmental temperature changes also cause the element to generate a small amount of electrical energy for storage in the electrical energy storage device.

Processing circuitry and a transmitter are also installed atop the head of the bolt. The electrical energy storage device communicates electrically with the processing circuitry and transmitter. As the tensile force developed in the bolt changes, the electrical properties of the piezoelectric material also change. One of the electrical properties affected is the impedance of the material. The processing circuitry uses the electrical energy developed by the tensile force changes, or previously stored in the electrical energy storage device due to piezoelectric or pyroelectric generation, to process the changes as evidenced by changes to the electrical impedance or other changes to the electrical properties, and to transmit a signal of these changes. The system includes a receiver for receiving the transmitted signal from the bolt, and a computer for monitoring the received signal.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
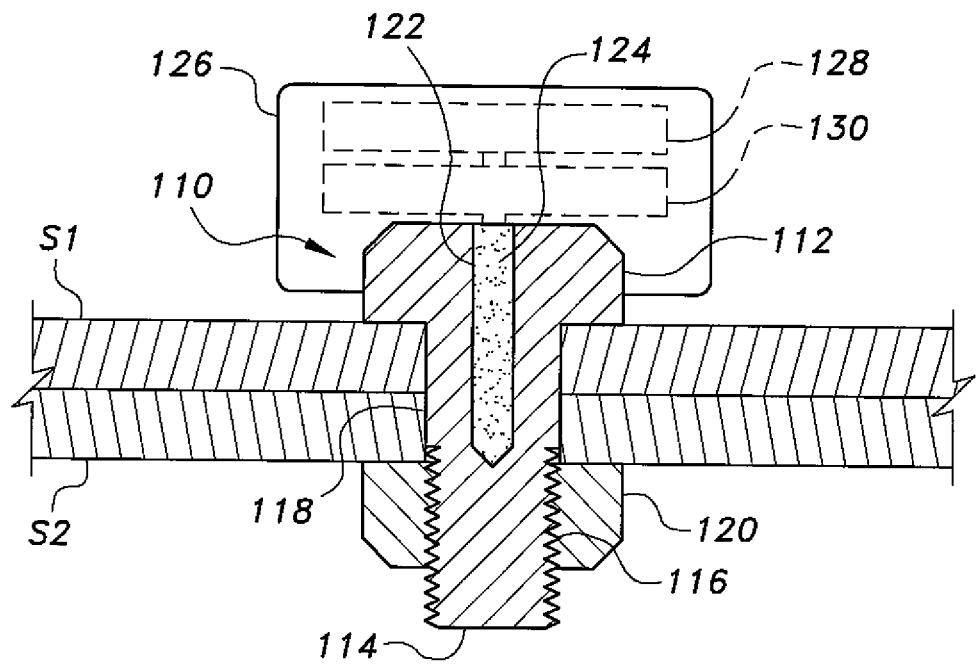
FIG. 1 is an environmental side elevation view in section of a threaded bolt installation in which the bolt incorporates a first embodiment of a fastener tension monitoring system according to the present invention.

The fastener tension monitoring system provides a means for measuring variations in the strain placed upon an installed tensile fastener, and particularly a bolt, and for generating the required electrical energy to provide a short range RF transmission signal to a receiver for monitoring and processing the signal. FIG. 1 of the drawings provides an elevation view in section of a threaded bolt 110 having a head 112 and an elongate shank 114 extending from the head. At least the distal portion 116 of the shank 114 may be threaded, and the proximal grip length portion 118 may be smooth and devoid of threads, although the entire length of the shank 114 may be threaded. A nut 120 is threaded onto the threaded distal portion 116 of the shank 114 to fasten two or more structural components, e.g., structural components S1 and S2, to one another. Other conventional components, e.g., washers, etc., are not shown for clarity in the drawing.

A receptacle 122 is formed through the head 112 and into at least the proximal portion 118 of the shank 114 adjacent the head 112. The receptacle 122 is filled with a piezoelectric material 124 that adheres to the inner walls of the receptacle 122. The piezoelectric material may be any of a number of such well-known materials, e.g., lead zirconate titanate (PZT), etc. The piezoelectric material has at least one electrical property that changes when the physical force applied to the material changes. The material 124 may be a pure piezoelectric compound or mixture, or may alternatively include at least some fraction of pyroelectric material to generate electrical energy as the temperature of the bolt 110 changes. An example of such pyroelectric material is lithium tantalate (LiTaO$_3$), which actually exhibits both pyroelectric and piezoelectric properties to make it a desirable material for use in the fastener tension monitoring system. By adhering the PZT (and/or LiTaO$_3$) material to the inner walls of the receptacle 122 of the bolt 110, slight changes in the elongation of the bolt due to loosening of the bolt and/or movement of the structural components S1 and S2 are imparted to the PZT or LiTaO$_3$, thus changing its electrical property(ies). One such electrical property that is affected by changes in the physical force imparted to the material is the electrical impedance of the material.

A cap 126 is attached to the head 112 of the bolt 110. The cap contains conventional microcircuitry 128 comprising an impedance reader, e.g., model AD5933 or other suitable unit, a microcontroller, and a very low power transmitter therein. A small electrical energy storage device 130, e.g., an electrical storage cell or battery, capacitor, etc., is also installed within the cap 126. The very small electrical currents generated by the piezoelectric material 124 due to slight variations in tension, and thus strain, applied to the bolt 110 are sufficient to charge the electrical energy storage device 130 over time. The electrical energy generated by the piezoelectric material 124 provides sufficient energy to operate the microcontroller to measure changes in impedance (or other electrical property) of the piezoelectric material 124 as forces on the bolt 110 change, and also to operate the short range transmitter. A corresponding receiver, discussed further below, receives any transmissions from the transmitter for processing and monitoring. Each cap 126 and its microcircuitry 128 may be provided with a code to identify the specific location of the associated bolt 110, thus enabling the receiver and processor to identify the specific bolt 110 that has loosened in its installation. While a cap 126 is shown and described for the embodiment of FIG. 1, it should be understood that sufficiently miniaturized microcircuitry may allow the entire component package of the microcircuitry 128 and the electrical energy storage device 130 to be disposed completely within the head 112 of the bolt 110, depending upon the size of the bolt.

Figure 2:
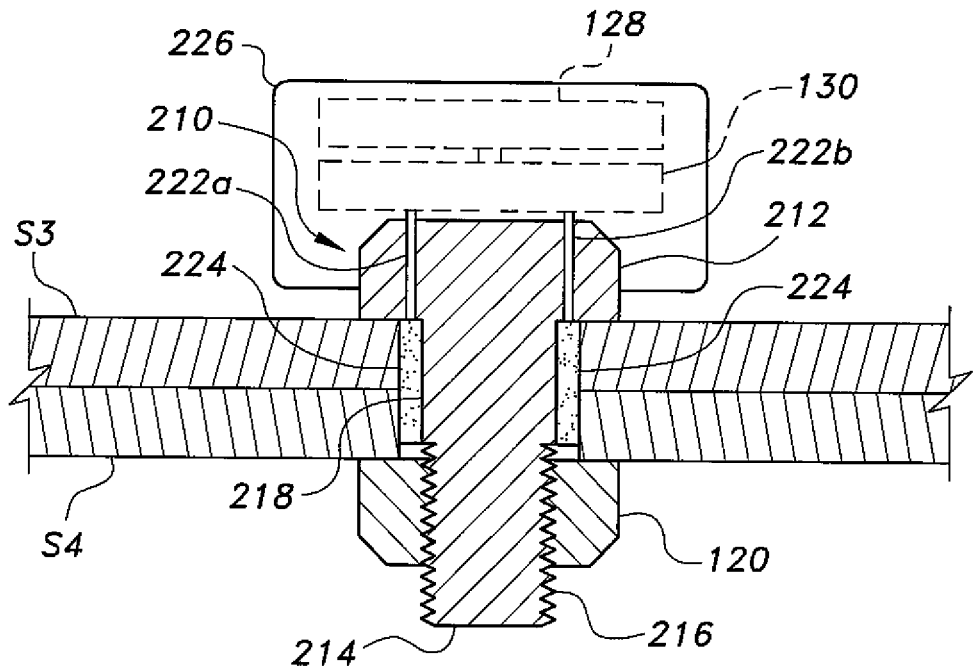
FIG. 2 is a side elevation view in section of a threaded bolt installation in which the bolt incorporates a second embodiment of a fastener tension monitoring system according to the present invention.

FIG. 2 provides an elevation view in section of another embodiment of the fastener tension monitoring system, wherein the piezoelectric and/or pyroelectric material is disposed circumferentially about the shank of the bolt. The bolt 210 of FIG. 2 is configured externally much like the bolt 110 of FIG. 1, having a head 212 and an elongate shank 214 extending therefrom. The distal portion 216 of the shank 214 is threaded, and the proximal grip length portion 218 of the shank 214 may be smooth and devoid of threads. A nut 120, identical to the nut 120 of the assembly illustrated in FIG. 1, is secured to the threaded distal end portion 216 of the shank 214 to grip the two structural components S3 and S4 between the head 212 and the nut 120.

It will be noted that the bolt 210 of FIG. 2 differs from the bolt 110 of FIG. 1 in that it has no central receptacle formed through the head 212 and upper or proximal portion of the shank 214. Rather, the piezoelectric and/or pyroelectric material 224 is applied externally as a circumferential sleeve around the unthreaded portion of the shank 214. The piezoelectric and/or pyroelectric material 224 is adhered to the exterior surface of the bolt shank 214, so that it will be subject to the same elongation and contraction stresses that occur in the bolt shank 214 if the tension in the bolt 210 changes. The piezoelectric and/or pyroelectric material 224 of the embodiment of FIG. 2 may be chemically identical to the piezoelectric and/or pyroelectric material 124 of the embodiment illustrated in FIG. 1, but differs in physical configuration due to its placement about the circumference of the unthreaded portion 218 of the bolt shank 214.

A cap 226 is attached to the head 212 of the bolt 210. The cap contains conventional microcircuitry 128 comprising an impedance reader, a microcontroller, and a very low power transmitter therein. The microcircuitry of the cap 226 is essentially identical to that contained in the cap 126 of the bolt 110 of FIG. 1, and accordingly need not be described further. The only difference between the cap 126 and the cap 226 is the provision for spaced apart electrical leads extending from the circumferentially applied piezoelectric and/or pyroelectric material 224, rather than having the leads immediately adjacent one another, as shown in FIGS. 1 and 2. Accordingly, lead passages 222a and 222b are provided through the bolt head 212 to allow the microcircuitry 128 and the electrical energy storage device 130, identical to those components described further above in FIG. 1, to communicate electrically with the piezoelectric and/or pyroelectric material 224.

Figure 3A:
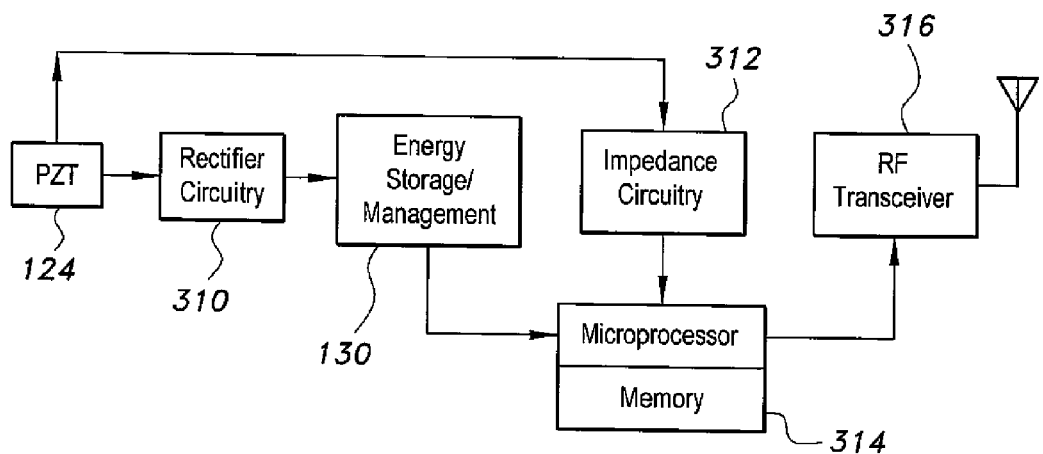
FIG. 3A is a block diagram of the components incorporated into a fastener in the fastener tension monitoring system according to the present invention.
Figure 3B:
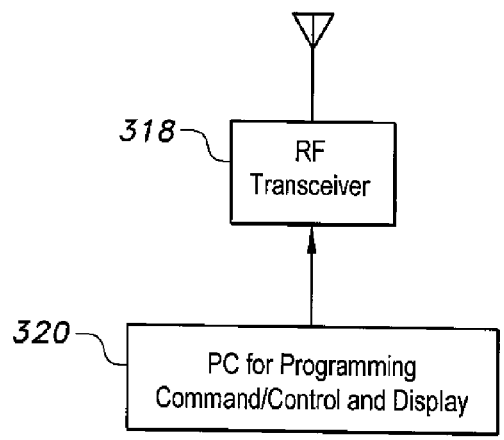
FIG. 3B is block diagram of the components incorporated in the receiver in the fastener tension monitoring system according to the present invention.

FIGS. 3A and 3B respectively provide block diagrams of the electronic and microelectronic components of the fastener tension monitoring system. FIG. 3A represents the components installed with the tensile fastener, while FIG. 3B represents the components installed remotely from the fastener.

The piezoelectric material (PZT) 124 of FIG. 3A is exemplary. It is understood that the embodiments of the piezoelectric and/or pyroelectric material 124 and 224 used in the present systems are chemically identical to one another. They differ only in their physical configurations, and may be used interchangeably as the PZT material 124 shown in FIG. 3A. The polarity of the generated electrical energy produced by the piezoelectric and/or pyroelectric material 124 will vary, depending upon the direction of movement of the fastener (extension or contraction of its length) and the direction of the temperature change (warmer or colder), in the case of pyroelectric material. Accordingly, the piezoelectric and/or pyroelectric material 124 communicates electrically with a rectifier 310 disposed in the microelectronic circuitry 128 disposed in the caps 126 and 226 of the various embodiments of the fastener tension monitoring system. Rectified (dc) electrical current then passes to an electrical energy storage and management device, i.e., the electrical storage cell or battery or capacitor 130 disposed in the caps 126, 226 of the various embodiments.

The piezoelectric and/or pyroelectric material 124 also communicates electrically with circuitry to measure changes in the electrical properties of the material 124 as changing physical forces are transferred from the fastener to the material. The present inventors have found that the measurement of the electrical impedance of the material 124 is perhaps the optimum means of determining the variations in the physical forces occurring. Accordingly, impedance measuring circuitry 312 is provided, and the piezoelectric and/or pyroelectric material 124 communicate electrically with the impedance measuring componentry 312.

The impedance measuring circuitry 312, in turn, communicates electronically with a microprocessor and electronic memory chip 314 for the storage of data and the processing of that data. The electrical energy required to operate the microprocessor and memory chip 314 is received from the electrical energy storage device 130. The microprocessor and memory chip 314 provides the data to a very low power radiofrequency (RF) transmitter 316, which, in turn, transmits the data via a wireless link to a receiver. The transmitter 316 may be a transceiver capable of receiving RF signals as well. In this manner, a signal transmitted back to the transceiver 316 may be used to clear and reset the microprocessor and memory 314, or to perform some other desired function.

The RF signal transmitted by the transmitter or transceiver 316 is received by a nearby receiver 318, shown in the block diagram of FIG. 3B. The receiver 318 may include RF transmission means, i.e., may be a transceiver, in order to transmit signals to the transceiver 316 that is physically located with the fastener. The receiver or transceiver 318 communicates electronically with a conventional computer 320 for storing and processing the data received, and displaying such data. The computer may be programmed using known, conventional means to transmit or display a signal in the event that tolerances of the fastener exceed certain predetermined parameters, and/or to retain a record of the data received from the fastener by means of its transmitter or transceiver 316.

It is to be understood that the present invention is not limited to the embodiments described above, but encompasses any and all embodiments within the scope of the following claims.

We claim:

1. A fastener tension monitoring system, comprising:
   a threaded bolt having a head and an elongate shank extending from the head, wherein the elongate shank comprises a proximal grip length portion and a distal portion, the distal portion being threaded and the proximal grip length portion being smooth;
   piezoelectric material disposed only along the proximal grip length portion of the shank and terminating at an interface between the proximal grip length portion and the distal portion;
   an impedance reader, microcontroller, and transmitter disposed atop the head of the bolt, the impedance reader, microcontroller, and transmitter communicating electrically with the piezoelectric material; and
   an electrical energy storage device disposed atop the head of the bolt, the electrical energy storage device communicating electrically with the impedance reader, microcontroller, transmitter, and piezoelectric material.

2. The fastener tension monitoring system according to claim 1, wherein the piezoelectric material also exhibits pyroelectric properties for generating electricity in response to environmental changes of temperature.

3. The fastener tension monitoring system according to claim 1, wherein the shank of the bolt includes an elongate receptacle formed therein, the piezoelectric material being disposed within the receptacle.

4. The fastener tension monitoring system according to claim 1, wherein the piezoelectric material is disposed circumferentially about the shank of the bolt.

5. The fastener tension monitoring system according to claim 1, further comprising:
   a receiver remotely disposed from the transmitter, the receiver communicating with the transmitter; and
   a computer communicating with the receiver.

* * * * *